(12) United States Patent
Stratman

(10) Patent No.: US 9,926,971 B2
(45) Date of Patent: *Mar. 27, 2018

(54) OMNI-DIRECTIONAL CONNECTION ASSEMBLY

(71) Applicant: A. Zahner Company, Kansas City, MO (US)

(72) Inventor: Randy Stratman, Prairie Village, KS (US)

(73) Assignee: A. Zahner Company, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,413

(22) Filed: Oct. 31, 2016

(65) Prior Publication Data
US 2017/0045081 A1 Feb. 16, 2017

Related U.S. Application Data

(63) Continuation of application No. 14/795,473, filed on Jul. 9, 2015, now Pat. No. 9,482,267.

(51) Int. Cl.
*E05D 5/10* (2006.01)
*F16C 11/04* (2006.01)
(Continued)

(52) U.S. Cl.
CPC ............ *F16C 11/04* (2013.01); *E04B 2/7427* (2013.01); *E05D 5/10* (2013.01); *E05D 7/00* (2013.01);
(Continued)

(58) Field of Classification Search
CPC ............ Y10T 16/557; Y10T 16/53607; Y10T 16/536075; Y10T 16/534; Y10T 16/546; Y10T 16/5535; Y10T 16/53625; E05D 3/02; E05D 5/10; E05D 5/125; E05D 5/127; E05D 5/12; E05D 5/128; E05D 7/00;
(Continued)

(56) References Cited

U.S. PATENT DOCUMENTS

| 2,683,892 A * | 7/1954 | Gorman | E05F 1/061 16/262 |
| 3,086,626 A * | 4/1963 | Bowers | E06B 3/5454 52/204.599 |

(Continued)

FOREIGN PATENT DOCUMENTS

GB 1542245 A * 3/1979 ........... E04B 2/7431

*Primary Examiner* — Chuck Mah
(74) *Attorney, Agent, or Firm* — Hovey Williams LLP

(57) ABSTRACT

An omni-directional connection assembly broadly includes a hinge pin and one or more connection brackets. The hinge pin comprises a base section, a pair of primary walls, and a pair of opposed projections. The primary walls form a primary slot therebetween for receiving an engagement portion of a first panel therein. The opposed projections are spaced from the primary walls and form elongated passageways for allowing the primary walls to bend slightly outward for receiving the engagement portion of the first panel. The connection brackets are U-shaped for being positioned over the hinge pin and including flanges for attaching the connection brackets to a second panel. The first and second panels are then connected together at angles of between 0 and 180 degrees or more.

16 Claims, 3 Drawing Sheets

(51) Int. Cl.
 *E04B 2/74* (2006.01)
 *E05D 7/00* (2006.01)
 *E05D 7/10* (2006.01)
 *E05D 3/02* (2006.01)

(52) U.S. Cl.
 CPC .............. *E05D 7/1061* (2013.01); *E05D 3/02* (2013.01); *E05D 2005/102* (2013.01); *E05D 2005/104* (2013.01); *E05D 2005/106* (2013.01); *E05D 2005/108* (2013.01); *E05Y 2900/10* (2013.01)

(58) Field of Classification Search
 CPC ....... E05D 7/1022; E05D 7/1072; E05D 7/10; E05D 7/1061; E05D 7/1077; E05D 15/12; E05D 15/26; E05D 2005/102; E05D 2005/104; E05D 2005/106; E05D 2005/108; B65D 43/165; E04B 2/7427; E06B 3/48; E06B 3/481; E06B 3/485; E06B 3/486; F16C 11/04; E05Y 2900/10
 See application file for complete search history.

(56) References Cited

U.S. PATENT DOCUMENTS

| | | | | |
|---|---|---|---|---|
| 3,233,277 A * | 2/1966 | Hirashiki | ................... | E05D 1/04 16/386 |
| 3,405,756 A * | 10/1968 | Harris | ................... | E06B 3/481 160/183 |
| 3,788,379 A * | 1/1974 | Rice | ................... | F16B 5/0607 160/235 |
| 3,939,620 A * | 2/1976 | Bero | ................... | E05D 1/02 52/476 |
| 3,962,827 A * | 6/1976 | Chaffee | ................... | E05D 1/04 16/239 |
| 4,120,130 A * | 10/1978 | Puschkarski | ................... | E04B 1/6112 403/110 |
| 4,592,604 A * | 6/1986 | Wilke | ................... | A47B 67/005 16/221 |
| 4,670,938 A * | 6/1987 | Fowlston | ................... | B65D 43/168 16/225 |
| 4,774,792 A * | 10/1988 | Ballance | ................... | E04B 2/7431 160/135 |
| 5,367,744 A * | 11/1994 | Ahlberg | ................... | E04B 2/7429 16/227 |
| 5,662,397 A * | 9/1997 | Neuhof | ................... | F16M 1/00 312/223.1 |
| 6,003,203 A * | 12/1999 | Fowlston | ................... | B65D 43/168 16/225 |
| 6,112,369 A * | 9/2000 | Lindsey | ................... | E05D 5/0215 16/227 |
| 6,261,026 B1 * | 7/2001 | Conley | ................... | F16B 5/0685 16/252 |
| 6,481,054 B1 * | 11/2002 | Hillstrom | ................... | A63B 71/0672 16/252 |
| 6,546,675 B1 * | 4/2003 | Adderton | ................... | E04B 2/7435 160/135 |
| 7,017,320 B2 * | 3/2006 | Chen | ................... | E04F 11/1851 256/24 |
| 7,178,198 B2 * | 2/2007 | Elmer | ................... | E05D 5/0246 16/239 |
| 2010/0180404 A1 * | 7/2010 | Chang | ................... | E05D 5/08 16/387 |

* cited by examiner

OMNI-DIRECTIONAL CONNECTION ASSEMBLY

RELATED APPLICATIONS

This patent application is a regular utility non-provisional continuation, and claims priority benefit with regard to all common subject matter, of earlier-filed non-provisional U.S. patent application Ser. No. 14/795,473, filed on Jul. 9, 2015, and entitled "OMNI-DIRECTIONAL CONNECTION ASSEMBLY". The identified earlier-filed non-provisional patent application is hereby incorporated by reference in its entirety into the present application.

BACKGROUND

Modern architecture often includes elaborate, unconventional, and/or artistic metal panels that are connected at atypical angles. The panels may also be connected at progressively increasing or decreasing angles so that no two connection assemblies are the same. Designing and assembling these panels requires many measurements, experimentation, trial-and-error, fabrication of multiple specialized connection pieces, and/or labor-intensive welding. The panels often do not immediately fit together and must be redesigned, modified, and/or re-welded until the panels fit together.

SUMMARY

The present invention solves the above-described problems and provides a distinct advance in the art of connection assemblies for decorative metal panels. More particularly, the present invention provides an omni-directional connection assembly that allows metal panels and other similar architectural members to be quickly and easily connected together at almost any desired angle.

An embodiment of the omni-directional connection assembly broadly includes a hinge pin and one or more connection brackets for connecting first and second panels together. The hinge pin includes an elongated, integrally formed metallic body having a base section, a pair of primary walls, and a pair of opposed projections. The primary walls extend axially along the base section and protrude substantially parallel to each other from the base section. The primary walls are spaced apart from each other so as to form a primary slot for receiving an engagement portion of the first panel therein. The opposed projections extend outwardly from the base section so as to form elongated passageways and secondary slots between the primary walls and the opposed projections. The elongated passageways and the secondary slots allow the primary walls to bend slightly outward for receiving the engagement portion of the first panel. The hinge pin (and other components) may be formed of a suitable material, such as anodized material, for allowing components of the assembly to rotate, even after securement, if desired for a particular application.

The connection brackets are U-shaped and each include a curved middle section, first and second legs, and first and second flanges. The curved middle section includes a curved inner surface for contacting and exerting a clamping force on the hinge pin. The first and second legs extend substantially parallel to each other from opposite ends of the curved middle section. The curved middle section and the first and second legs cooperatively form an inner engagement channel for receiving the hinge pin therein. The flanges extend in opposite directions from each other from distal ends of the legs. The flanges each include at least one fastener hole for connecting the connection brackets to the second panel.

The first and second panels may be connected together via the connection assembly as follows. First, the engagement portion of the first panel may be inserted into the primary slot of the hinge pin. The hinge pin will retain the first panel in the primary slot via an interference fit between the first panel and the primary walls of the hinge pin. The hinge pin may then be positioned against the second panel. The connection brackets may then be positioned in slots of the first panel with the hinge pin extending through the inner engagement channels of the connection brackets and the flanges of the connection brackets positioned against the second panel. Fasteners may then be inserted through the fastener holes of the flanges and complementary fastener holes of the second panel so that the connection brackets are loosely connected to the second panel. The first panel and the hinge pin may then be rotated axially to the desired attachment angle. The fasteners may then be tightened so that the connection brackets secure the hinge pin and the first panel to the second panel and prevent the hinge pin and the first panel from rotating in relation to the second panel. In some embodiments, the hinge pin may be free to continue to rotate, even after securement, if desired for a particular application.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
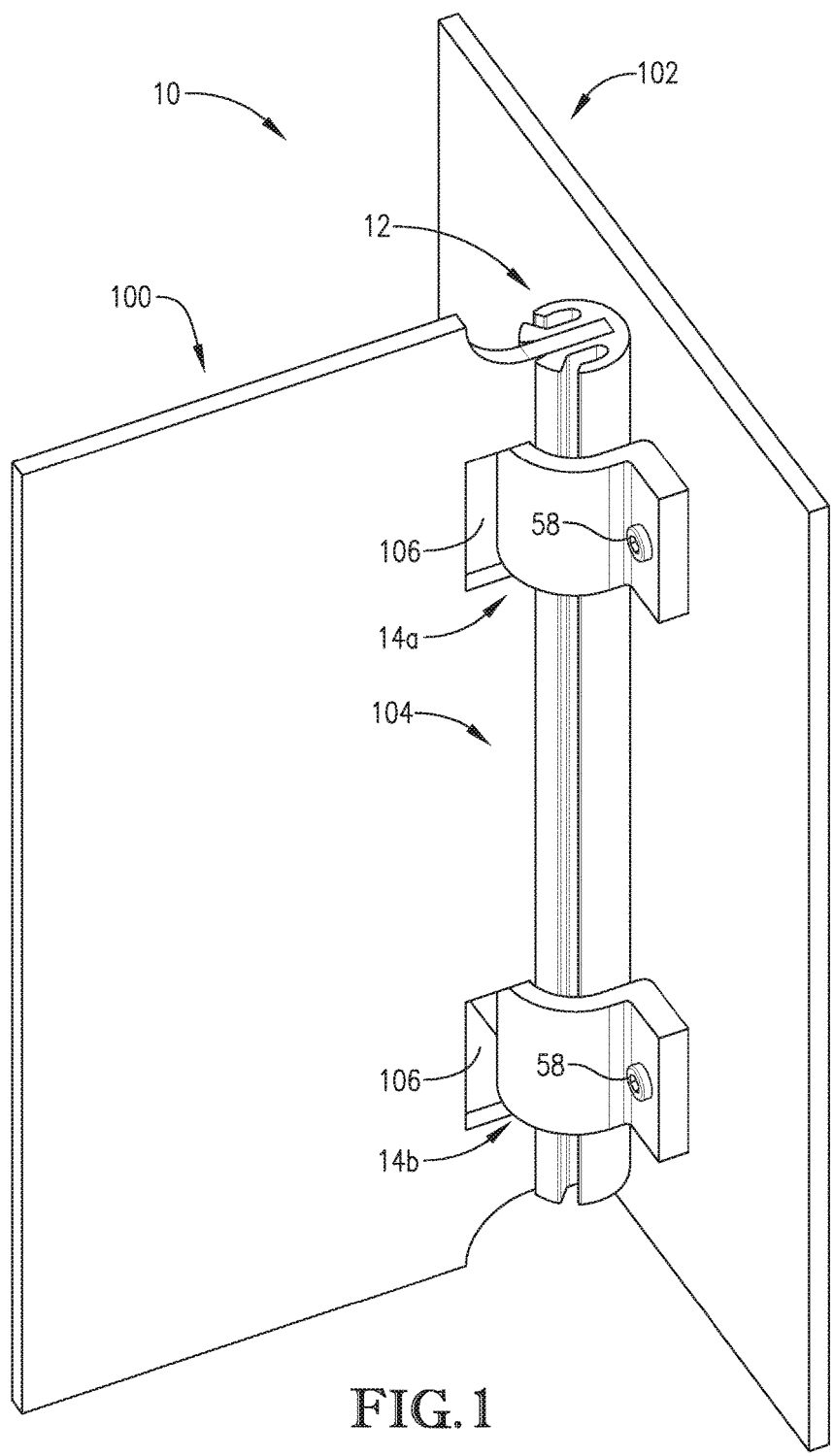
FIG. 1 is a perspective view of a connection assembly constructed in accordance with an embodiment of the present invention and shown connecting a first panel to a second panel.
Figure 2:
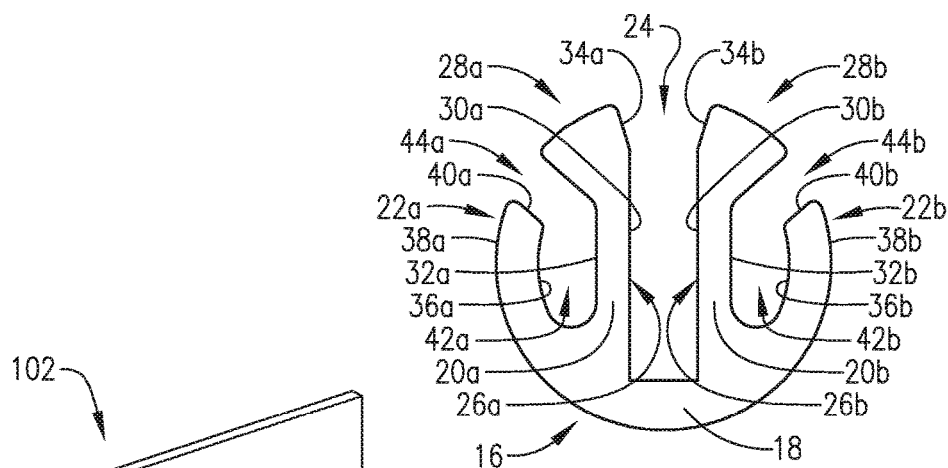
FIG. 2 is an enlarged end view of the hinge pin of the connection assembly of FIG. 1.
Figure 3:
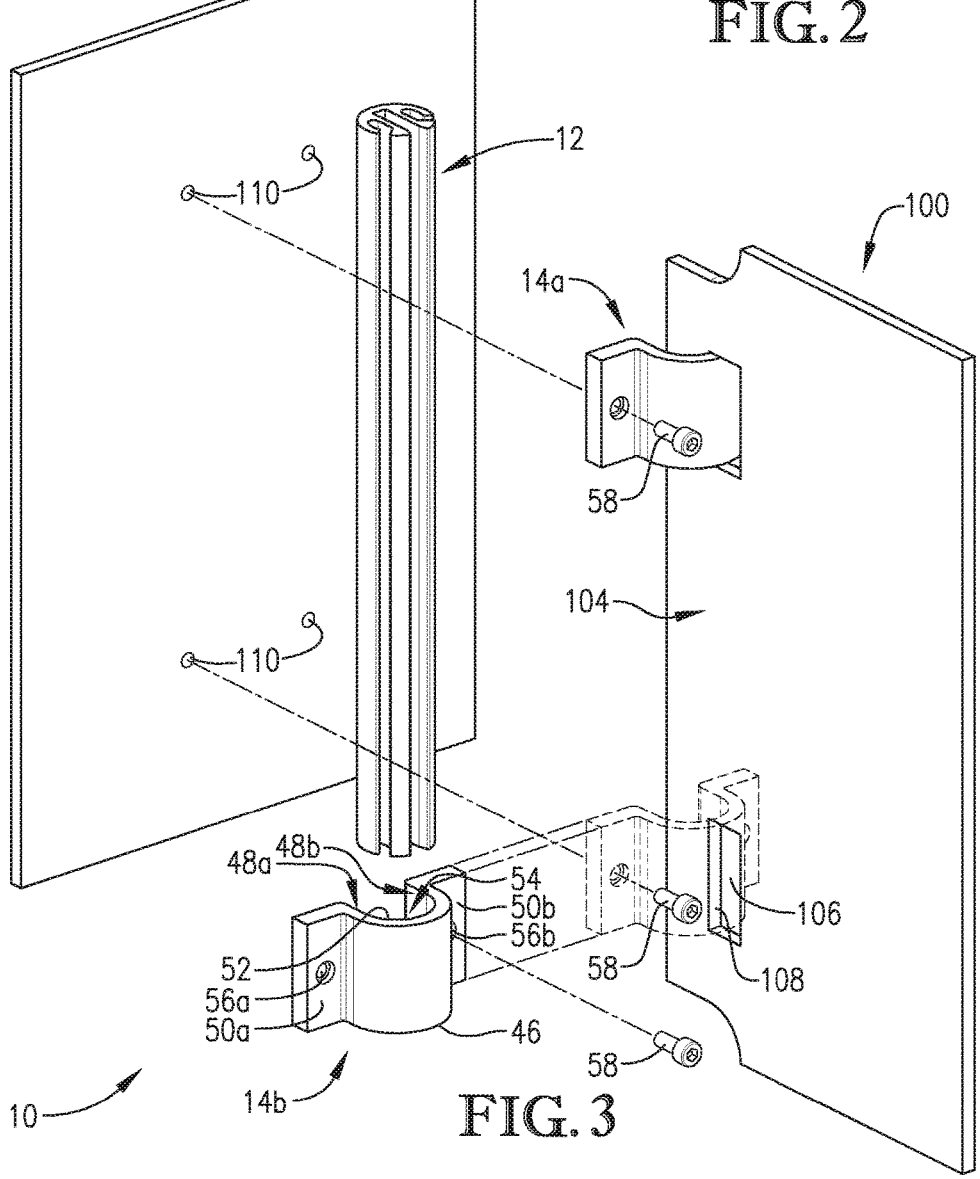
FIG. 3 is an assembly view of the connection assembly and the first and second panels of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to one embodiment", an embodiment", or "embodiments" mean that the feature or features being referred to are included in at least one embodiment of the technology. Separate references to one embodiment", an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, a connection assembly 10 constructed in accordance with an embodiment of the present invention is shown attaching a first panel 100 to a second panel 102. The first and second panels 100, 102 may be formed of aluminum, steel, or titanium sheet metal, contoured metal, metal-dipped flexible material, screen material, or wire material, or any other suitable material. The first panel 100 includes an engagement portion 104 extending from a distal end of first panel 100 and one or more slots 106 spaced from each other near the engagement portion 104. The slots 106 form bracket engagement surfaces 108 for contacting connection brackets, as described below. The second panel 102 includes a number of fastener holes 110 for fastening the connection brackets to the second panel 102, as described below. The connection assembly 10 broadly comprises a hinge pin 12 and one or more connection brackets 14a,b.

The hinge pin 12 connects to the first panel 100 and comprises an axially shiftable and substantially cylindrical elongated shaft. The hinge pin 12 includes a primary body 16 integrally formed of machined or extruded metal such as aluminum, steel, titanium, or any other suitable material. The primary body 16 comprises a base section 18, a pair of primary walls 20a,b, and a pair of opposed projections 22a,b.

The base section 18 extends between the primary walls 20a,b and the opposed projections 22a,b so as to form a single rigid shaft.

The primary walls 20a,b extend axially along the base section 18 and protrude substantially parallel to each other from the base section 18 so as to form a primary slot 24 therebetween. The primary walls 20a,b include inner ends 26a,b, free outer ends 28a,b, inner sidewall surfaces 30a,b, and outboard sidewall surfaces 32a,b. The inner ends 26a,b are adjacent to the base section 18. The free outer ends 28a,b extend from the inner ends 26a,b and may be wider than the inner ends 26a,b. The free outer ends 28a,b may have a convex outer shape for more evenly receiving securing forces as described below. The inner sidewall surfaces 30a,b face towards each other and are adjacent to the primary slot 24. The inner sidewall surfaces 30a,b may be offset a predetermined distance from each other so that the primary walls 20a,b and the engagement portion 104 of the first panel 100 exhibit an interference fit therebetween. The inner sidewall surfaces 30a,b may include distal portions 34a,b that gradually extend away from each other such that the primary slot 24 widens near its mouth. This makes inserting the first panel 100 into the primary slot 24 easier. The outboard sidewall surfaces 32a,b may be substantially flat or concave for more evenly distributing securing forces from the connection brackets 14 as described below.

The opposed projections 22a,b extend outwardly from the base section 18 and may have concave inner surfaces 36a,b, convex outer surfaces 38a,b, and outermost ends 40a,b. The curvature of the inner surfaces 36a,b and the outer surfaces 38a,b increases the strength of the hinge pin 12 and more evenly distributes securing forces received from the connection brackets 14a,b. The inner surfaces 36a,b are spaced from the outboard sidewall surfaces 32a,b of the primary walls 20a,b so as to form elongated passageways 42a,b extending along the length of the primary body 16. The outermost ends 40a,b are spaced from the free outer ends 28a,b so as to form secondary slots 44a,b extending from the elongated passageways 42a,b.

The connection brackets 14a,b engage the hinge pin 12 for securing the hinge pin 12 and the first panel 100 to a second panel 102 and may be formed of machined or extruded metal such as aluminum, steel, or titanium, or any other suitable material. The connection brackets 14a,b may be sized and shaped for being positioned in the slots 106 of the first panel 100 and over the hinge pin 12 and the bracket engagement surfaces 108 of the first panel 100. The connection brackets 14a,b each include a curved middle portion 46, first and second legs 48a,b, and first and second flanges 50a,b.

The curved middle portion 46 includes a concave inner surface 52 for contacting the convex surfaces of the free outer ends 28a,b of the primary walls 20a,b, the convex outer surfaces 38a,b of the projections 22a,b, and the engagement portions 106 of the first panel 100. The middle portion 46 and the legs 48a,b cooperatively form an inner engagement channel 54 for receiving the hinge pin 12 and the bracket engagement surfaces 108 of the first panel 100 therein. The curvature of the inner surface 52 is substantially similar to the curvature of the hinge pin 12 for evenly distributing clamping forces from the connection brackets 14a,b to the hinge pin 12 and the first panel 100.

The legs 48a,b extend substantially parallel to each other from opposite ends of the curved middle portion 46 for contacting the second panel 102 on either side of the hinge pin 12.

The flanges 50a,b provide mounting points for connecting the connection brackets 14a,b to the second panel 102 and extend in opposite directions from each other from distal ends of the legs 48a,b. The flanges 50a,b may each include one or more fastener holes 56a,b extending therethrough for inserting fasteners 58 therein. The fastener holes 56a,b may be counterbore, countersunk, threaded, smooth, or other hole type for receiving associated fasteners 58 therein. The fastener holes 56a,b may be spaced a predetermined distance from each other for aligning with the fastener holes 110 in the second panel 102. In one embodiment, the fastener holes 56a,b may be positioned halfway between sides of the flanges 50a,b and halfway between the legs 48a,b and the ends of the flanges 50a,b.

The fasteners 58 may be bolts, screws, pins, rivets, nails, or any other type of fastener for securing the flanges 50a,b to the second panel 102.

Assembling the connection assembly 10 will now be described in detail. The engagement portion 104 of the first panel 100 may first be inserted into the primary slot 24 so that the end of the engagement portion 104 is positioned near the bottom of the primary slot 24 and so that bracket engagement surfaces 108 of the engagement portion 104 are flush with the free outer ends 28a,b of the primary walls 20a,b. The distal portions 34a,b of the inner sidewall surfaces 30a,b help guide the engagement portion 104 of the first panel 100 into the primary slot 24. Inserting the first panel 100 into the primary slot 24 may require a small to medium amount of force due to the interference fit between the primary walls 20a,b and the first panel 100.

The hinge pin 12 and the attached first panel 100 may then be placed adjacent to the second panel 102 at a desired attachment location.

The connection brackets 14 may then be positioned in the slots 106 of the first panel 100 with the hinge pin 12 extending through the engagement channel 54 so that the flanges 50a,b are adjacent to the second panel 102 and the fastener holes 56a,b are aligned with the fastener holes 110 of the second panel 102.

The fasteners 58 may then be inserted into the fastener holes 56a,b of the flanges 50a,b and the fastener holes 110 of the second panel 102 so that the connection brackets 14a,b are loosely connected to the second panel 102.

The hinge pin 12 and the first panel 100 may then be rotated about the hinge pin's axis to a desired angular orientation relative to the second panel 102.

The fasteners 58 may then be tightened so that the connection brackets 14 are securely connected to the second panel 102. The inner surfaces 52 of the connection brackets 14a,b contact the convex surfaces of the free outer ends 28a,b of the primary walls 20a,b, the convex outer surfaces 38a,b of the projections 22a,b, and the bracket engagement surfaces 108 of the first panel 100. The connection brackets 14a,b exert a compressive force on the free outer ends 28a,b of the primary walls 20a,b of the hinge pin 12 so that the primary walls 20a,b clamp the engagement portion 104 of the first panel 100. The force of the connection brackets 14a,b on the hinge pin 12 also affixes the hinge pin 12 and the first panel 100 in the desired angle relative to the second panel 102. However, in some embodiments, the hinge pin may be free to continue to rotate, even after securement, if desired for a particular application.

The above-described connection assembly 10 provides several advantages over conventional connection methods. For example, the connection assembly 10 eliminates the need for costly welding and welding training and eliminates the possibility of bad welds. The connection assembly 10 also reduces or eliminates the need to design and fabricate tens or hundreds of unique parts. This is particularly useful in unconventional metal construction wherein each joint may have slightly different angles, sizes, and/or loads. This also eliminates the need to redesign or rework the parts if the assembly does not quite match up due to unconventional or imprecise metal-working. The connection assembly 10 allows the first and second panels 100, 104 to be attached to each other at any angle from 0 degrees to 180 or greater depending on the geometry of the panels 100, 104. The angle of the connection assembly 10 can be adjusted by rotating the hinge pin 12 and the first panel 100 while the fasteners 58a,b are loosened. This allows for complicated and uniquely shaped construction to be adjusted and modified without breaking welds, bending or hammering connection joints, or modifying the lengths or shapes of the panels 100, 104. In other embodiments, the hinge pin may be free to rotate, even after securement, if desired for a particular application. The elongated passageways 42a,b and the secondary slots 44a,b allow the primary walls 20a,b to flex and/or bend slightly for evenly contacting and exerting an even clamping force on the engagement portion 104 of the first panel 100. The distal portions 34a,b of the inner sidewall surfaces 30a,b of the primary walls 20a,b also allow the first panel 100 to be more easily inserted into the primary slot 24.

Figure 4:
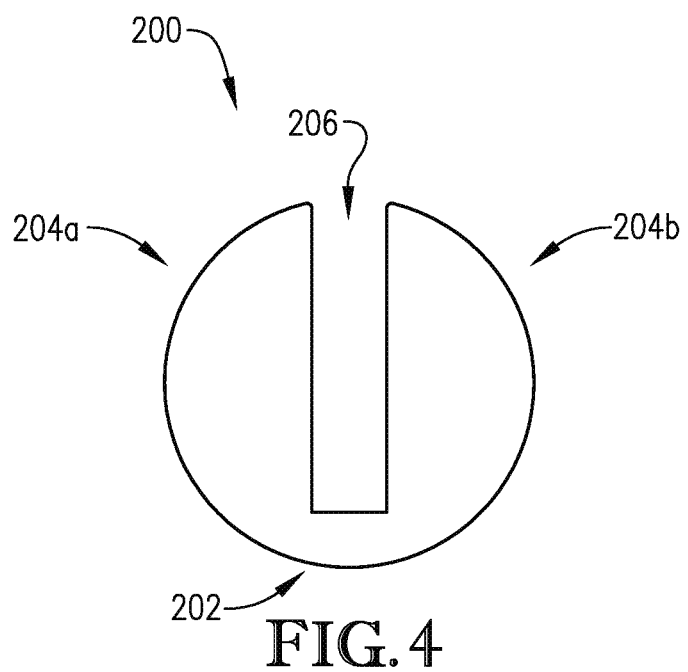
FIG. 4 is an enlarged end view of a hinge pin constructed in accordance with another embodiment of the present invention.

Turning now to FIG. 4, a hinge pin 200 constructed in accordance with another embodiment of the present invention will now be described in detail. The hinge pin 200 broadly comprises a base section 202 and left and right walls 204a,b. The hinge pin 200 may be formed of aluminum or any other suitable material and may be an extruded or machined cylinder or similar shape.

The base section 202 may be substantially similar to the base section 18 described above. The outer surface of the base section 202 may be curved so as to form a portion of the overall cylindrical shape of the hinge pin 200.

The left and right walls 204a,b extend from the base section 202 and form the remainder of the cylindrical shape of the hinge pin 200. The left and right walls 204a,b may be spaced apart from each other so as to form a slot 206 therebetween. The slot 206 may be substantially rectangular in shape for receiving a panel tab or other portion of a panel or other member therein.

The hinge pin 200 provides many advantages including simple construction via extrusion or machining. The hinge pin 200 also appears to be a solid cylinder when a panel is inserted into the slot 206 so as to effect a simple looking and disguised connection point.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A connection assembly operable to connect a first panel to a second panel at a desired angle between the panels, said connection assembly comprising:

an elongated, cylindrical hinge pin including metallic body presenting a base section and a pair of generally parallel and axially extending walls which extend from said base section and cooperatively define therebetween an elongated, panel-receiving slot having an open top, each of said walls having an inner end adjacent said base section and a free outer end, and an inner sidewall surface adjacent said slot; and a connection bracket having opposing first and second sides, said connection bracket configured to engage said body and adapted for connection to said second panel, said connection bracket serving to place said hinge pin in compression when attached to said second panel in order to secure said first panel in said slot, said hinge pin extending laterally beyond said first and second sides of said connection bracket such that at least a portion of said panel-receiving open-topped slot is exposed laterally beyond said first and second sides so that said first panel can extend outwardly from said open top of said slot on either side of said connection bracket.

2. The connection assembly of claim 1, said free outer end of each of said walls having a convex shape for evenly receiving compressive forces from said connection bracket.

3. The connection assembly of claim 1, said slot being substantially rectangular.

4. The connection assembly of claim 1, wherein said inner sidewall surfaces are spaced apart a predetermined distance from each other so that said walls exhibit an interference fit with said first panel when said first panel is positioned in said slot.

5. The connection assembly of claim 1, wherein said inner sidewall surfaces each include a distal portion near said free outer end, said distal portions gradually extending away from each other so that said slot widens near said free outer ends for guiding said first panel into said slot.

6. The connection assembly of claim 1, wherein said connection bracket is further configured to exert a compression on said walls at least partially in the direction of said slot for urging said walls against said first panel, said walls being configured to maintain a uniform predetermined distance between said inner sidewall surfaces.

7. The connection assembly of claim 1, wherein said connection bracket is further configured to be positioned over an engagement portion of said first panel for retaining said portion of said first panel in said slot.

8. The connection assembly of claim 1, wherein said connection bracket includes a curved middle section, first and second legs extending substantially parallel to each other from opposite ends of said curved middle section, and first and second flanges extending in opposite directions from each other from distal ends of said first and second legs for connecting said connection bracket to said second panel.

9. The connection assembly of claim 8, wherein said curved middle section includes a concave inner-facing surface having a curvature approximately equal to a curvature of said body of said hinge pin.

10. The connection assembly of claim 8, wherein said flanges each include a fastener hole extending therethrough for connecting the connection bracket to the second flange via the fasteners inserted through the fastener holes.

11. The connection assembly of claim 1, further comprising a second connection bracket being configured to engage said body a predetermined distance from said at least one connection bracket and adapted for connection to said second panel.

12. The connection assembly of claim 1, wherein said hinge pin is integrally formed of extruded metal and shiftable about a longitudinal axis.

13. A connection assembly operable to connect a first panel to a second panel at a desired angle between the panels, said connection assembly comprising:
an axially shiftable and substantially cylindrical hinge pin including an elongated, integrally formed metallic body,
said body presenting a base section and a pair of generally parallel and axially extending walls which extend from said base section and cooperatively define therebetween an elongated, panel-receiving slot, each of said walls having an inner end adjacent said base section and a free outer end, and an inner sidewall surface adjacent said slot, said inner sidewall surface having a distal portion gradually extending outward from a center of said panel-receiving primary slot so that said slot widens near said free outer ends; and
a connection bracket configured to engage said body and adapted for connection to said second panel, said bracket including a curved middle section, first and second legs extending substantially parallel to each other from opposite ends of said curved middle section, and first and second flanges extending in opposite directions from each other from distal ends of said first and second legs and including fastener holes for connecting said bracket to said second panel via fasteners, said bracket serving to place said hinge pin in compression when attached to said second panel in order to secure said first panel in said slot.

14. A connection assembly operable to connect a first panel to a second panel at a desired angle between the panels, said connection assembly comprising:
a hinge pin including an elongated metallic body presenting a base section and a pair of generally parallel and axially extending walls which extend from said base section and cooperatively define therebetween an elongated, panel-receiving slot, each of said walls having an inner end adjacent said base section and a free outer end, and an inner sidewall surface adjacent said slot; and
a connection bracket configured to engage said body and adapted for connection to said second panel, said connection bracket including a curved middle section, first and second legs extending substantially parallel to each other from opposite ends of said curved middle section, and first and second flanges extending in opposite directions from each other from distal ends of said first and second legs for connecting said connection bracket to said second panel, said connection bracket serving to place said hinge pin in compression when attached to said second panel in order to secure said first panel in said slot.

15. The connection assembly of claim 14, wherein said curved middle section includes a concave inner-facing surface having a curvature approximately equal to a curvature of said body of said hinge pin.

16. The connection assembly of claim 14, wherein said flanges each include a fastener hole extending therethrough for connecting the connection bracket to the second flange via the fasteners inserted through the fastener holes.

* * * * *